United States Patent [19]
Spector

[11] Patent Number: 5,921,505
[45] Date of Patent: Jul. 13, 1999

[54] SYSTEM AND METHOD FOR REDUCING MECHANICAL DISTURBANCES FROM ENERGY STORAGE FLYWHEELS

[75] Inventor: Victor A. Spector, Gardena, Calif.

[73] Assignee: TRW Inc., Redondo Beach, Calif.

[21] Appl. No.: 08/758,514

[22] Filed: Dec. 2, 1996

[51] Int. Cl.[6] ................................................. B64G 1/28
[52] U.S. Cl. ............................................ 244/165; 701/13
[58] Field of Search .................................. 244/165, 171;
114/122; 701/13

[56] References Cited

U.S. PATENT DOCUMENTS

| | | | |
|---|---|---|---|
| 4,230,294 | 10/1980 | Pistiner | 244/165 |
| 4,275,861 | 6/1981 | Hubert | 244/165 |
| 4,334,226 | 6/1982 | Eguchi et al. | |
| 4,454,463 | 6/1984 | Popescu . | |
| 4,623,202 | 11/1986 | Shingu . | |
| 4,668,885 | 5/1987 | Scheller . | |
| 4,688,746 | 8/1987 | Cooper | 244/165 |
| 4,713,692 | 12/1987 | Kirkland . | |
| 4,723,735 | 2/1988 | Eisenhaure et al. | 244/165 |
| 4,858,858 | 8/1989 | Bruederle . | |
| 5,139,218 | 8/1992 | Bird et al. | |
| 5,214,981 | 6/1993 | Weinberger et al. . | |
| 5,279,483 | 1/1994 | Blancke et al. | 244/165 |
| 5,306,975 | 4/1994 | Bichler . | |
| 5,308,024 | 5/1994 | Stetson, Jr. | 244/165 |
| 5,315,158 | 5/1994 | Danielson | 244/165 |
| 5,444,743 | 8/1995 | Scarpa . | |

FOREIGN PATENT DOCUMENTS 0712781   11/1995   European Pat. Off. .

*Primary Examiner*—S. Joseph Morano
*Attorney, Agent, or Firm*—Michael S. Yatsko

[57] ABSTRACT

Method and system providing enhanced mechanical stability in an electrically-powered vehicle. The system includes an electrical power subsystem arranged on a vehicle structure. At least two counter-rotating energy storage flywheels are mounted to a flywheel mounting plate. Torque sensors are arranged between the flywheel mounting plate and the vehicle structure for sensing a net torque on the vehicle resulting from the pair of flywheels and generating a torque signal indicative thereof. A vehicle attitude sensor produces an attitude signal and detects disturbances to the vehicle. A vehicle attitude actuator and electronic processing equipment are connected to the pair of counter-rotating energy storage flywheels, the torque sensors, the vehicle attitude sensor, the vehicle attitude actuator, and the electrical power subsystem. The electronic processing equipment processes the attitude signal and the torque signal to provide a control signal to the vehicle attitude actuator for reducing the net torque on the vehicle. The system also adjustably controls an attitude of the vehicle in response to the output of the sensors and counteracts disturbances resulting from the at least two counter-rotating energy storage flywheels.

39 Claims, 11 Drawing Sheets

SYSTEM AND METHOD FOR REDUCING MECHANICAL DISTURBANCES FROM ENERGY STORAGE FLYWHEELS

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Current spacecraft and electric vehicles typically use rechargeable chemical batteries to store electrical energy. Despite decades of research, rechargeable chemical batteries continue to be large and heavy. Thus, they have a low volume energy density and a low weight energy density. In addition, chemical batteries are expensive and difficult to manufacture and maintain. Further, chemical batteries contain hazardous or toxic materials and require temperature control. Also, rechargeable chemical batteries can only provide a small percentage of their total stored energy as usable electrical energy. This means that the chemical batteries have a low depth of discharge. Chemical batteries also suffer irreversible progressive deterioration from each charge/discharge cycle, which means they have a limited cycle life.

Flywheels can eliminate many of the problems associated with rechargeable chemical batteries. Flywheels store kinetic energy in a high speed rotor and use a motor/generator to convert between electrical and mechanical energy. However, for many applications, flywheels cannot be simply used as "drop-in" replacements for chemical batteries. In particular, an inevitable by-product of using a spinning rotor is the production of angular momentum and torque. For many applications (such as spacecraft and underwater vehicles) the amount of angular momentum and torque produced as a by-product of using a flywheel for energy storage is several orders of magnitude greater than can be tolerated by the attitude control system (ACS).

A first order solution to the problem of unwanted angular momentum and torque is to arrange the energy storage flywheels as counter-rotating pairs. In the ideal case, the angular momentum and torque cancels exactly. However, any practical flywheel system will have some level of residual mismatch in such parameters as the rotor mass moment of inertia, spin speeds, rotor spin axis, and motor/generator power flow. Even if these parameters could be initially matched during manufacture, maintaining the match over time, and under changing temperature situations, as well as vibration environments, is not currently feasible.

The basic concept to using counter-rotating pairs of flywheels for energy storage alone or for energy storage and attitude control is discussed in U.S. Pat. No. 4,723,735. This patent mentions including at least two flywheels with their angular momenta balanced to produce zero net angular momentum. However, this reference does not state how the balance is achieved in practice.

In addition, as a practical manufacturing matter, pairs of counter-rotating flywheels must be matched to produce zero net torque. However, this is extremely difficult with known production methods. Thus, a large amount of testing and matching is needed to find pairs of flywheels that are properly matched to produce zero net torque. As a result, providing exact duplicates for counter-rotating pairs is very costly in both time and money. Therefore, a method and apparatus are needed which would allow the use of less exacting tolerances on the flywheel pairs yet still provide a zero net torque output from the pairs.

Therefore, as a result of the short-comings of rechargeable chemical batteries and known flywheel energy systems, the need has arisen for a method and apparatus for reducing mechanical disturbances from energy storage flywheels.

BRIEF SUMMARY OF THE INVENTION

A system for reducing mechanical disturbances from energy storage flywheels in an electrically-powered vehicle is provided. The system comprises at least two counter-rotating energy storage flywheels arranged on the vehicle. Each flywheel produces a component torque which combine to form a net torque on the vehicle. Means for sensing the net torque and producing a net torque output is provided. Vehicle control means for controlling attitude of the vehicle and means for sensing attitude motion of the vehicle (induced in part by an external disturbance) and providing an output indicative of the attitude motion (rate and/or angle and/or acceleration) is also provided. In addition, means for adjusting a relative speed or orientation of at least one of the flywheels in response to the net torque output and the output of the sensing means thereby counteracting the external disturbance and the net torque is provided.

A method for reducing mechanical disturbances from energy storage flywheels arranged in an electrically-powered vehicle is also provided. The method comprises the steps of sensing an attitude motion of the vehicle (induced in part by an external disturbance) and providing an output indicative of the attitude motion (rate and/or angle and/or acceleration) of the vehicle to provide a vehicle attitude output; processing the vehicle attitude output to produce a control signal; providing a means of partitioning the control signal into two components; providing a means for controlling the vehicle attitude using the first component of the partitioned control signal; and modifying a relative speed or orientation of the energy storage flywheels in response to the second component of the partitioned control signal to reduce the effect of the external disturbance and the net torque produced by the flywheels on the vehicle.

DETAILED DESCRIPTION OF THE INVENTION

The present invention provides a method and apparatus for reducing mechanical disturbances from energy storage flywheels. The present invention lowers the cost and enhances the producibility of flywheels by reducing the need to maintain tight manufacturing tolerances for rotor inertia matching and relative alignment. The present invention automatically balances torque and momentum in a flywheel system thereby adapting to changes over time, temperature and vibration. The present invention also allows for smaller actuators and improves attitude control performance of a vehicle by reducing torque and momentum disturbances.

An advantage of the method and apparatus of the present invention is to minimize the impact of the flywheel energy storage system on the vehicle ACS by relieving the vehicle control reaction wheels of having to store the net momentum resulting from flywheel mismatch. In addition, the invention has the additional benefit of using the flywheels, with their typically large momentum capability, to store at least a portion of the momentum resulting from external disturbances. This second advantage further reduces the reaction wheel requirements.

Figure 1:
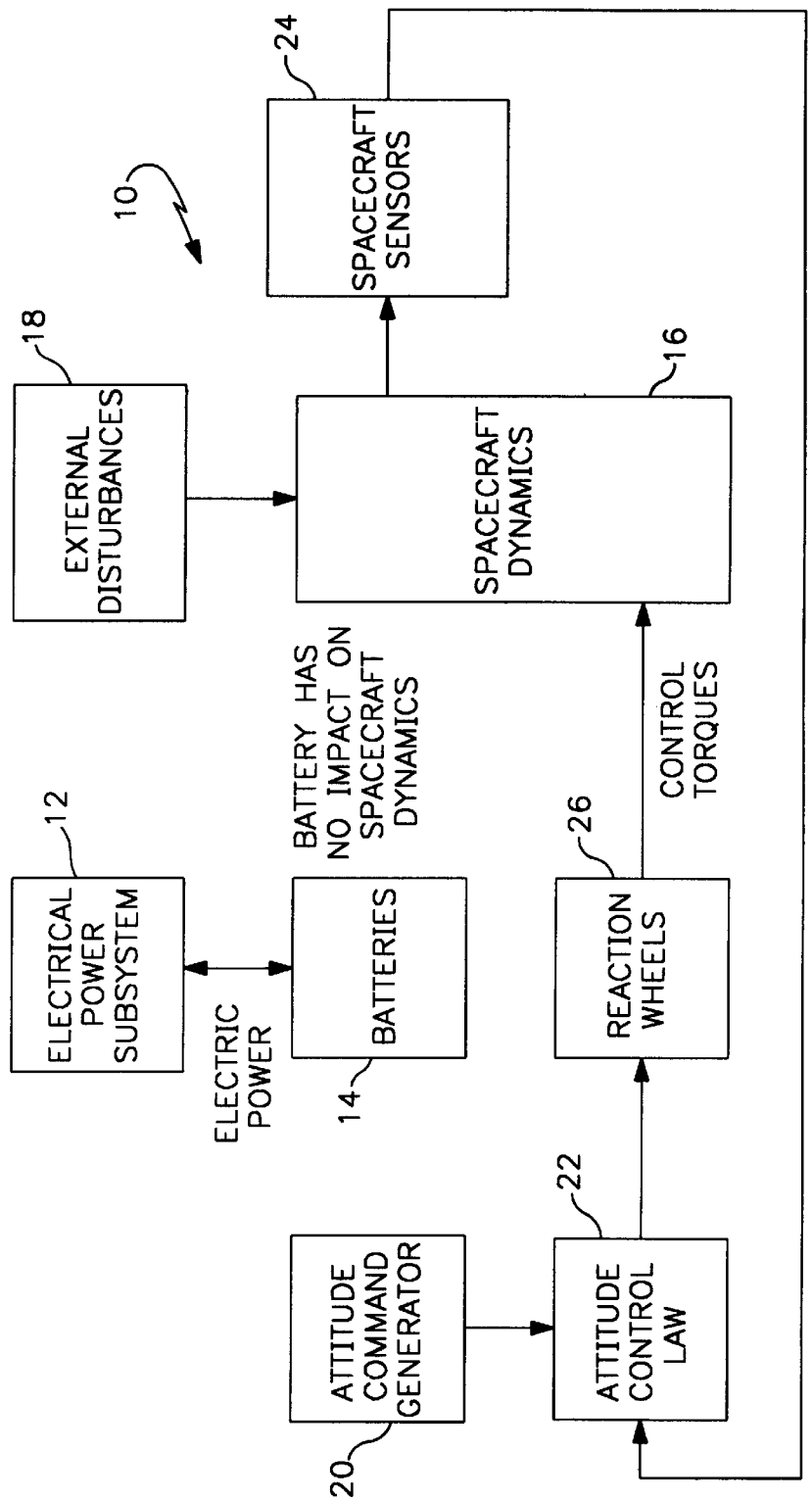
FIG. 1 is a block diagram of a prior art conventional spacecraft with battery energy storage.

As shown in FIG. 1, which illustrates a block diagram of a conventional spacecraft with battery energy storage, batteries have been used for powering a spacecraft. As shown in FIG. 1, the batteries, however, have virtually no impact on the spacecraft flight dynamics. The conventional spacecraft system illustrated generally at 10 includes an electrical power subsystem 12 having batteries 14. Also illustrated is a spacecraft dynamics module 16 which has an external disturbances input 18. Examples of external disturbances include solar pressure, aerodynamic disturbances, magnetic disturbances, gravity gradient, as well as reactions of the spacecraft to movements of certain elements of the spacecraft, like rotation of a solar array.

In addition, an attitude command generator 20 is connected to an attitude control law 22. The attitude control law 22 is part of a feedback loop comprising spacecraft sensors 24, as well as reaction wheels 26. The control loop acts to counter the torques and disturbances which impact the spacecraft dynamics 16. As shown schematically, the batteries 14 do not have an impact on the spacecraft dynamics 16. As mentioned above, the batteries 14 have many other drawbacks. As a result, the use of flywheels as an energy storage source is generally beneficial in spacecraft systems as long as the mechanical disturbances generated are controlled.

Figure 2:
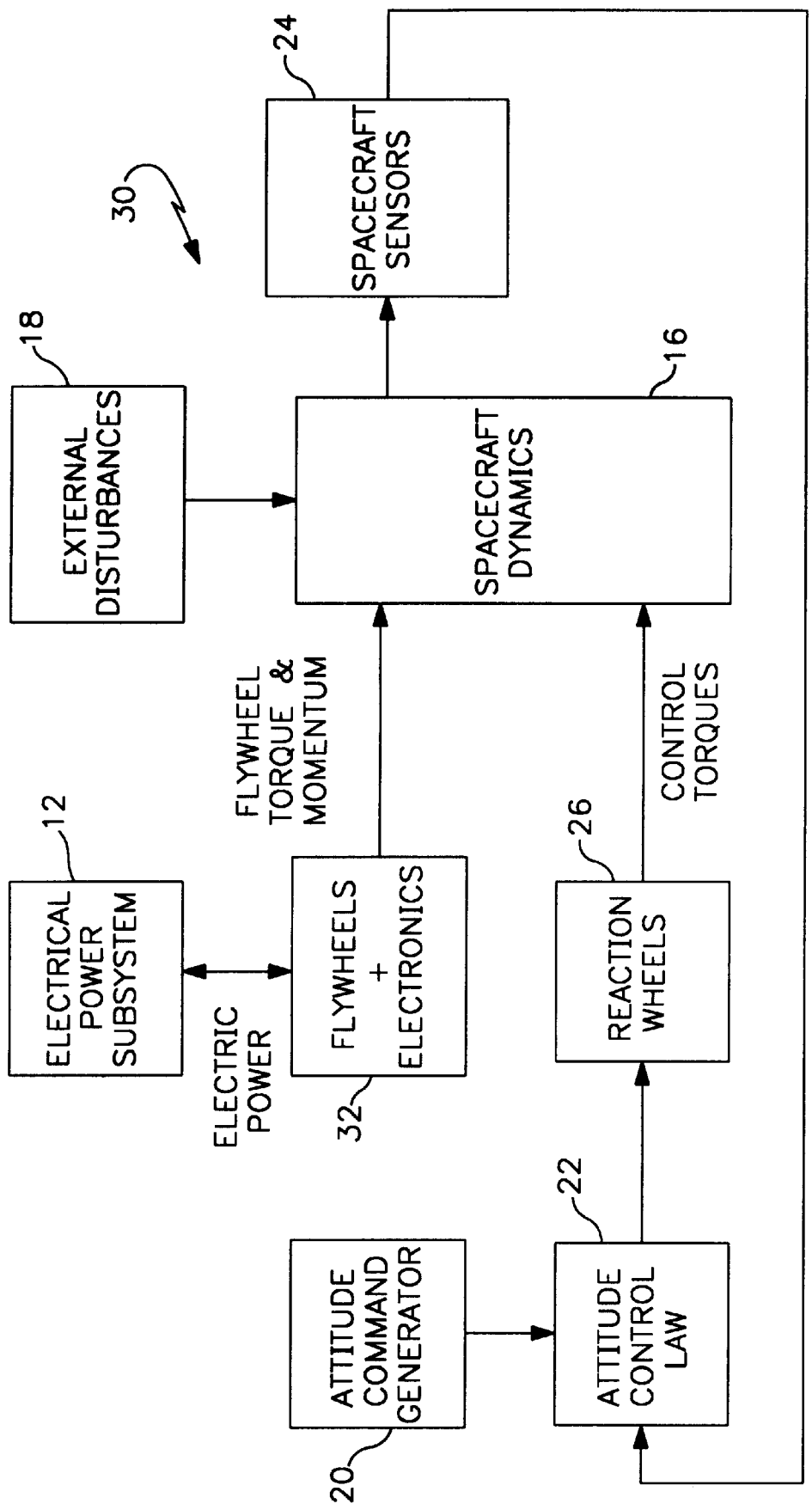
FIG. 2 is a block diagram of a spacecraft with flywheel energy storage illustrating the use of flywheels as a replacement for batteries as shown in FIG. 1.

FIG. 2 illustrates a spacecraft system 30 utilizing flywheels 32 for energy storage only. In FIG. 2, like parts are referenced with like numerals. The reaction wheels 26 must be used to counteract the torques generated by the total flywheel disturbance caused by the flywheels 32. As shown, the flywheels 32 present an additional disturbance input to the spacecraft dynamics 16 represented by the flywheel torque and momentum input to the spacecraft dynamics 16. Thus, the use of flywheels as a "drop-in" replacement for batteries has certain drawbacks, as well, that must be overcome.

Figure 3:
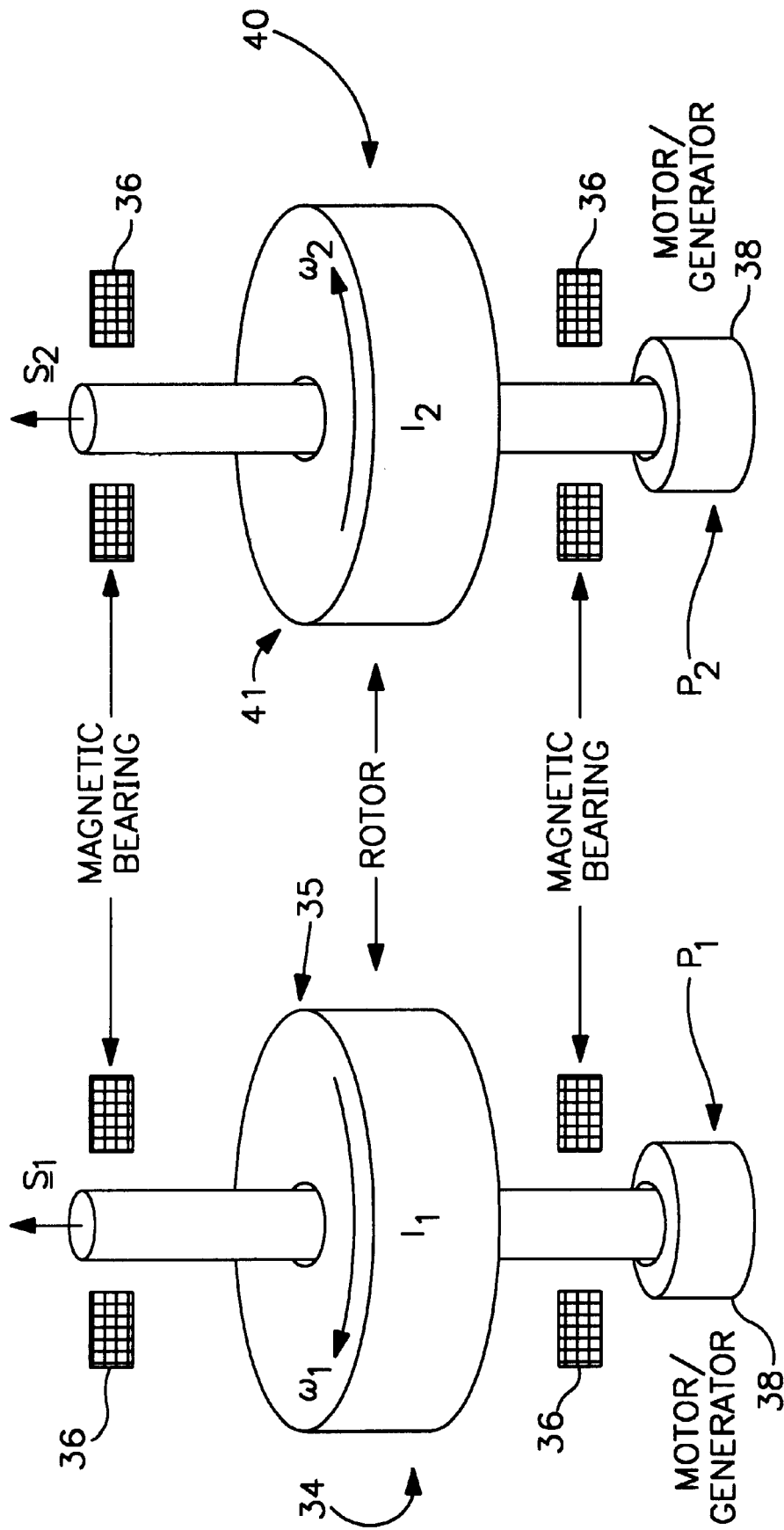
FIG. 3 is a schematic diagram illustrating the electro-mechanical components of a known counter-rotating energy storage flywheel pair.

FIG. 3 illustrates the mechanical factors that must be overcome to provide an ideal counter-rotating flywheel pair. FIG. 3 shows a first flywheel 34 having an axis of rotation $S_1$ and a rotor 35 with a moment of inertia $I_1$. The rotor 35 is illustrated as spinning in a clockwise direction with an angular velocity $\omega_1$. Magnetic bearings 36 are also provided to keep the flywheel 34 in a proper axial orientation. Also, a motor/generator 38 is provided. Similarly, a second flywheel 40 is shown. The second flywheel 40 has a rotor 41 with a mass moment of inertia $I_2$ and spins counter-clockwise with angular velocity $\omega_2$ along an axis of rotation $S_2$. The motor/generator 38, as well as the magnetic bearings 36, are provided as in the first flywheel 34.

In an ideal situation, the counter-rotating flywheel pair 34, 40 produces zero net angular momentum and torque when the rotor mass moments of inertia are equal, $I_1=I_2$, and the rotor spin speeds are equal in opposite directions, $\omega_1=-\omega_2$. In addition, the rotor spin axes are equal $S_1=S_2$, and the motor/generator power flow represented by $P_1$ for flywheel 34 and by $P_2$ for flywheel 40 are equal in the ideal situation. When all of these parameters are equal, the counter-rotating flywheel pair 34, 40 will produce no net angular momentum or torque. This is an ideal situation, of course, and in practice is not achievable without certain measures being undertaken. Further, as mentioned above, any practical flywheel system will have some level of residual mismatch in these parameters. Even if these parameters could be initially matched during manufacture, maintaining the match over time and under different temperatures and vibration environments is not easily accomplished. Also, perfectly matching the parameters is very costly when such precise tolerances are absolutely required.

Figure 4:
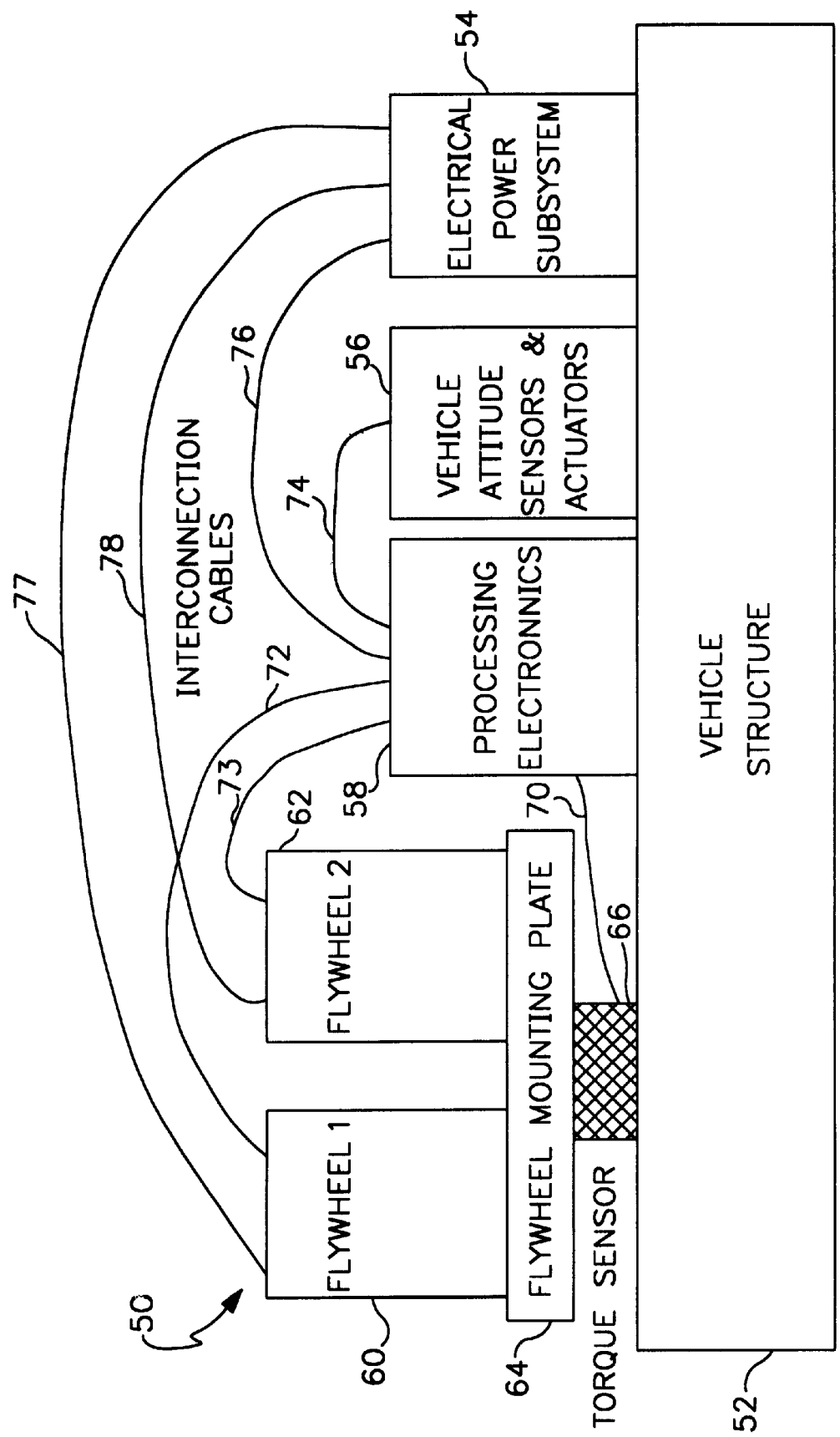
FIG. 4 is a schematic diagram of an embodiment of an apparatus for reducing mechanical disturbances from energy storage flywheels operating in accordance with the principles of the present invention.

FIG. 4 illustrates an embodiment of a single flywheel pair incorporated into a vehicle structure showing the interconnections between components. A flywheel-powered vehicle (for example, a spacecraft or underwater vessel) including an apparatus for reducing mechanical disturbances from energy storage flywheels is illustrated generally at 50. A vehicle structure 52 is shown having various components connected thereto. For example, an electrical power subsystem 54, vehicle attitude sensors and actuators 56, and processing electronics 58 are also illustrated as being mounted to the vehicle structure 52. Further, a first flywheel 60 and a second flywheel 62 are shown mounted on a flywheel mounting plate 64. The flywheel mounting plate 64 is in turn mounted on the vehicle's structure 52 via a torque sensor 66. By way of example, the vehicle attitude sensors of the vehicle attitude sensors and actuators 56 may include a gyroscope, a sun sensor, a star sensor, an earth sensor, a magnetometer or a horizon sensor.

Various interconnection cables enable communications links for signals between the various components. For example, the processing electronics 58 is connected to the torque sensor via a cable 70. The processing electronics 58 is also connected to the first flywheel 60 by a cable 72 and to the second flywheel 62 via a cable 73. In addition, the processor electronics 58 is connected via a cable 74 to the vehicle attitude sensors and actuators 56 and via a cable 76 to the electrical power subsystem 54.

In addition, the first flywheel 60 is connected to the electrical power subsystem 54 via cable 77. Similarly, the second flywheel 62 is connected via a cable 78 to the electrical power subsystem 54. The torque sensor 66 is used to detect mechanical disturbances between the first flywheel 60 and the second flywheel 62 and the vehicle structure 52. Signals are communicated via cable 70 between the torque sensor 66 and the processing electronics 58. Various other signals are utilized between the various components and described below. A further description of the torque sensor 66 follows.

In an embodiment of the present invention, the torque sensor 66 is placed between the counter-rotating flywheel pair 60, 62 and the vehicle structure 52. The torque sensor 66 may be a single multi-axis device or be synthesized from multiple force sensors with known separations.

An inventive feature of the present invention is the use of sensors external to the flywheel units to provide additional feedback commands to the flywheels to thereby reduce mechanical disturbances resulting from flywheel mismatches. To this end, two basic categories of sensors may be utilized in embodiments of the present invention, torque sensors and vehicle attitude sensors. Each type is mounted to the vehicle. Either category of sensor may be used alone or in combination to control the torques and disturbances generated by flywheels 60, 62. As described below in an exemplary embodiment, this inventive feature is described primarily in terms of a single pair of counter-rotating flywheels. However, the inventive concept also applies to multiple pairs of counter-rotating flywheels in other arrangements of multiple flywheels such as a pyramidal arrangement.

As shown in FIG. 4, the flywheels 60, 62 are mounted to the torque sensor 66 so that a single torque sensor system directly measures the total net torque from the pair of flywheels 60, 62. This avoids the need to precision match (gain, phase and scale factor) multiple sensors to detect a small difference between the large torques produced by an individual flywheel. Since an embodiment of the present invention utilizes a single torque sensor 66 and a nulling loop, the torque sensor 66 can have relatively modest performance in terms of gain, phase and scale factor. This results in a torque sensor of reduced cost. If necessary, in a particular application, the use of vehicle attitude sensors 150 (see FIG. 10) can reduce the impact of any residual torque sensor errors such as bias shift or offset.

Figure 5:
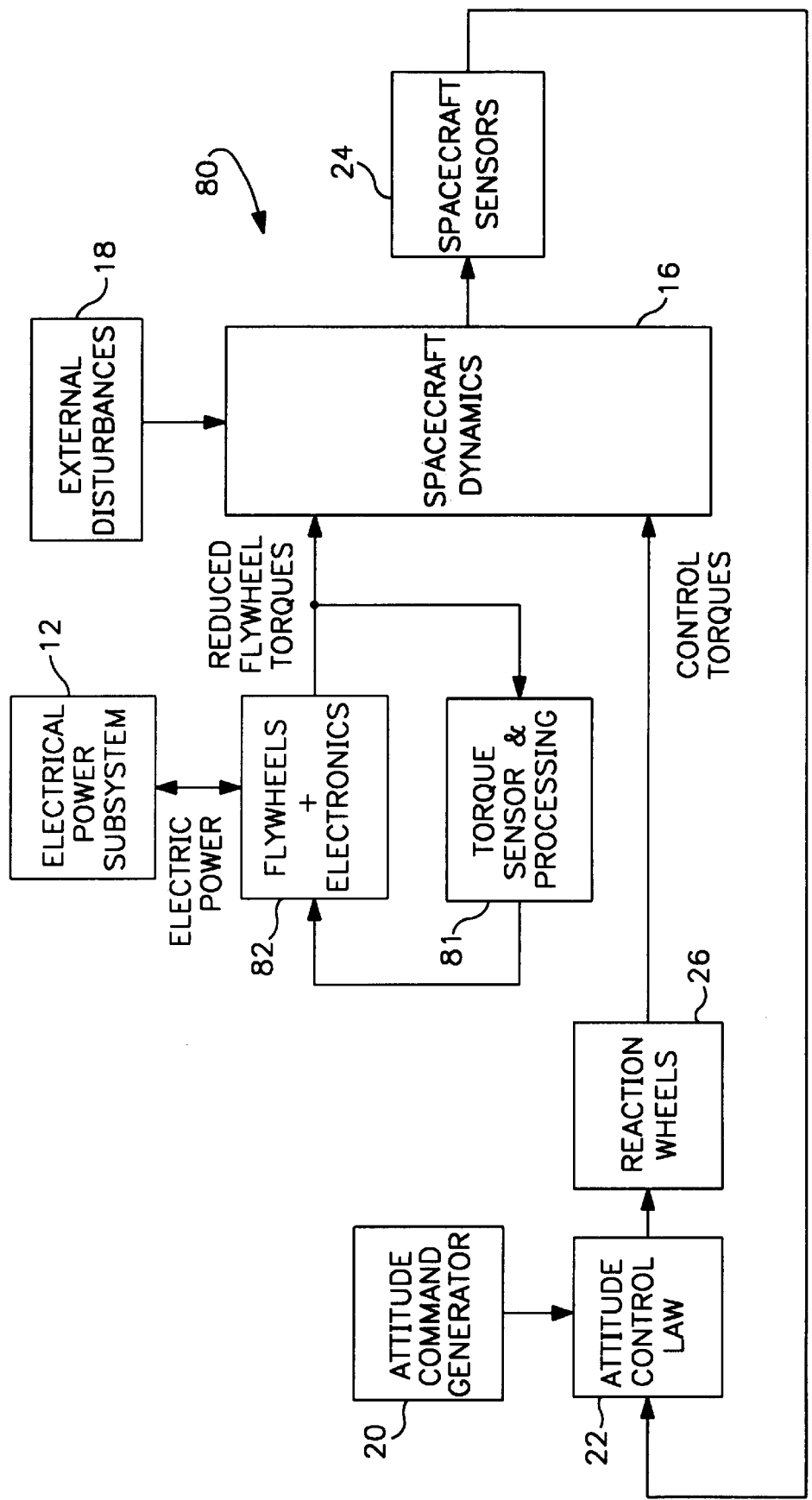
FIG. 5 is a schematic block diagram of an embodiment of the present invention illustrating the use of a torque sensor to facilitate the control of flywheel disturbance torques.

FIG. 5 is an embodiment of the present invention referenced generally at 80 illustrating the use of the torque sensor 66 of FIG. 4 in a torque sensor and processing block 81. The torque sensor and processing block 81 reduces flywheel disturbance torques by using negative feedback in a relatively high bandwidth nulling loop. In the embodiment shown in FIG. 5, the measured torque is processed to produce a control signal that is used to modify the relative speed or orientation of the flywheel rotors in such a way as to reduce the net torque produced by the flywheels. The torque sensor and processing block 81 is connected in the feedback loop to flywheels and electronics block 82. The remaining similar elements from FIG. 2 are referenced with similar reference numbers in FIG. 5. The torque sensor and processing block 81 is illustrated in more detail in FIG. 6.

Figure 6:
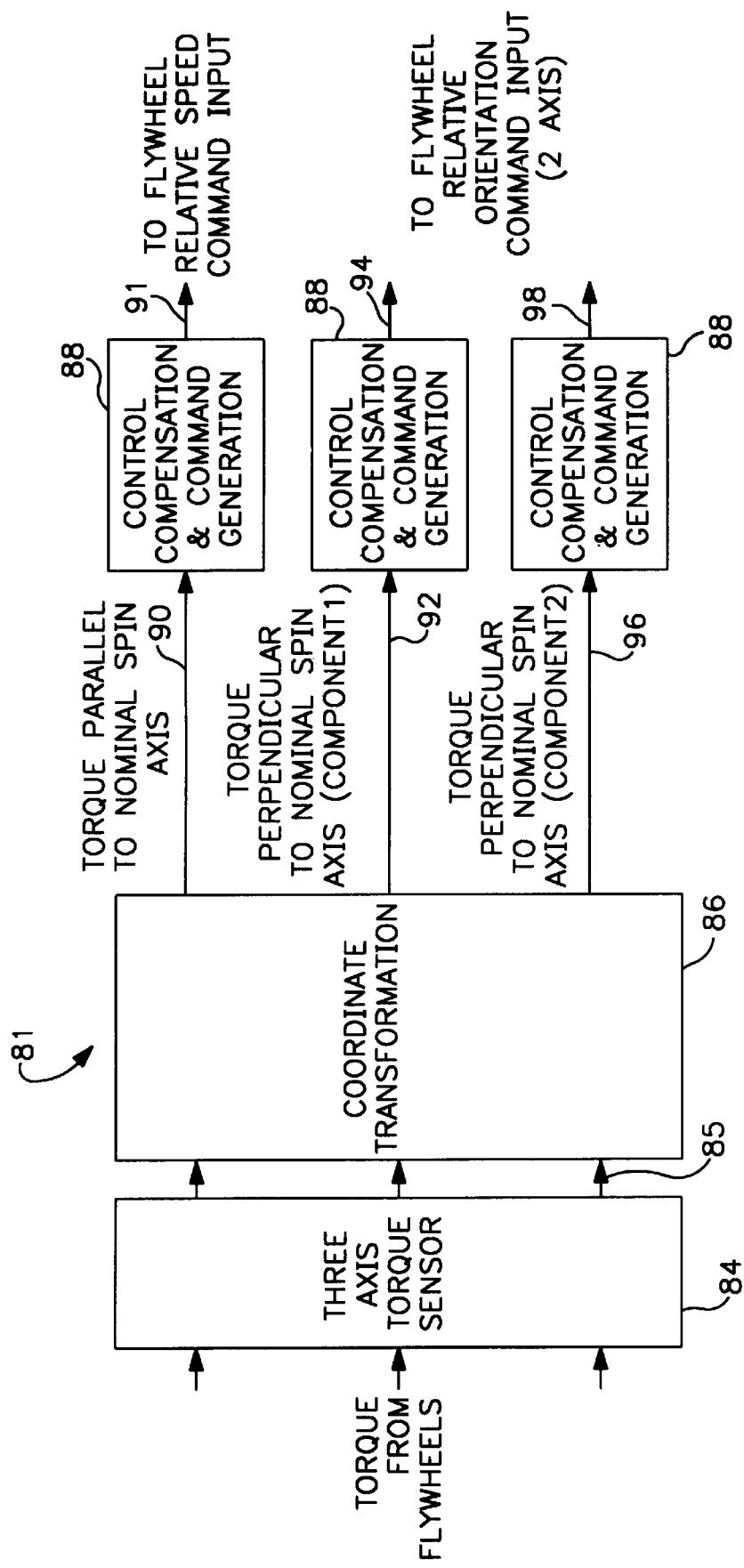
FIG. 6 is a schematic block diagram of an embodiment of a torque sensor and processing component, as illustrated in FIG. 5, for a counter-rotating flywheel pair operating in accordance with the principles of the present invention.

FIG. 6 illustrates an embodiment of the torque sensor and processing block 81 using one pair of flywheels with the capability to command relative speed and orientation of the rotors. The torque signals from the flywheels are measured by a 3-axis torque sensor 84. The 3-axis torque sensor 84 provides output signals 85 to a coordinate transformation matrix 86 which resolves the torque measurements to the control axes. The control axes are preferably orthogonal and may be the axes for pitch, roll and yaw. However, the transformation matrix 86 may be used to resolve the torque measurements to any desired axes. Each component of the transformed measured torque is then applied to a control compensation and command generation function unit 88.

For example, a torque 90 parallel to the nominal spin axes $S_1$, $S_2$ is applied to the control compensation and command generation unit 88 and provides a relative speed command input 91 to the flywheels 34, 40. In addition, torque along an axis perpendicular to the nominal spin axis having a first component 92 is an input to the control compensation and command generation unit 88 and provides an output 94 to the flywheel relative orientation command input 94. Similarly, a second component 96 of the torque along an axis perpendicular to the nominal spin axis is provided as an input to the control compensation and command generation unit 88 to provide a flywheel relative orientation command input 98. The perpendicular axes may extend through magnetic bearings 36, as long as the perpendicular axes are in a plane perpendicular to the spin axes $S_1$, $S_2$. Optionally, each of the perpendicular axes may be perpendicular to each other.

The relative speed command input 91 is provided to the flywheels 34, 40 for adjusting speed to reduce the disturbing torque. The relative orientation commands, having the first component 94 and the second component 98, are utilized to correct for a deviation of the orientation of the flywheels 34, 40 as measured from the spin axes. The relative speed command input 91 also relates to the fact that one of flywheels 34, 40 may be rotating at one speed and the other at a slightly slower or faster speed.

Figure 7:
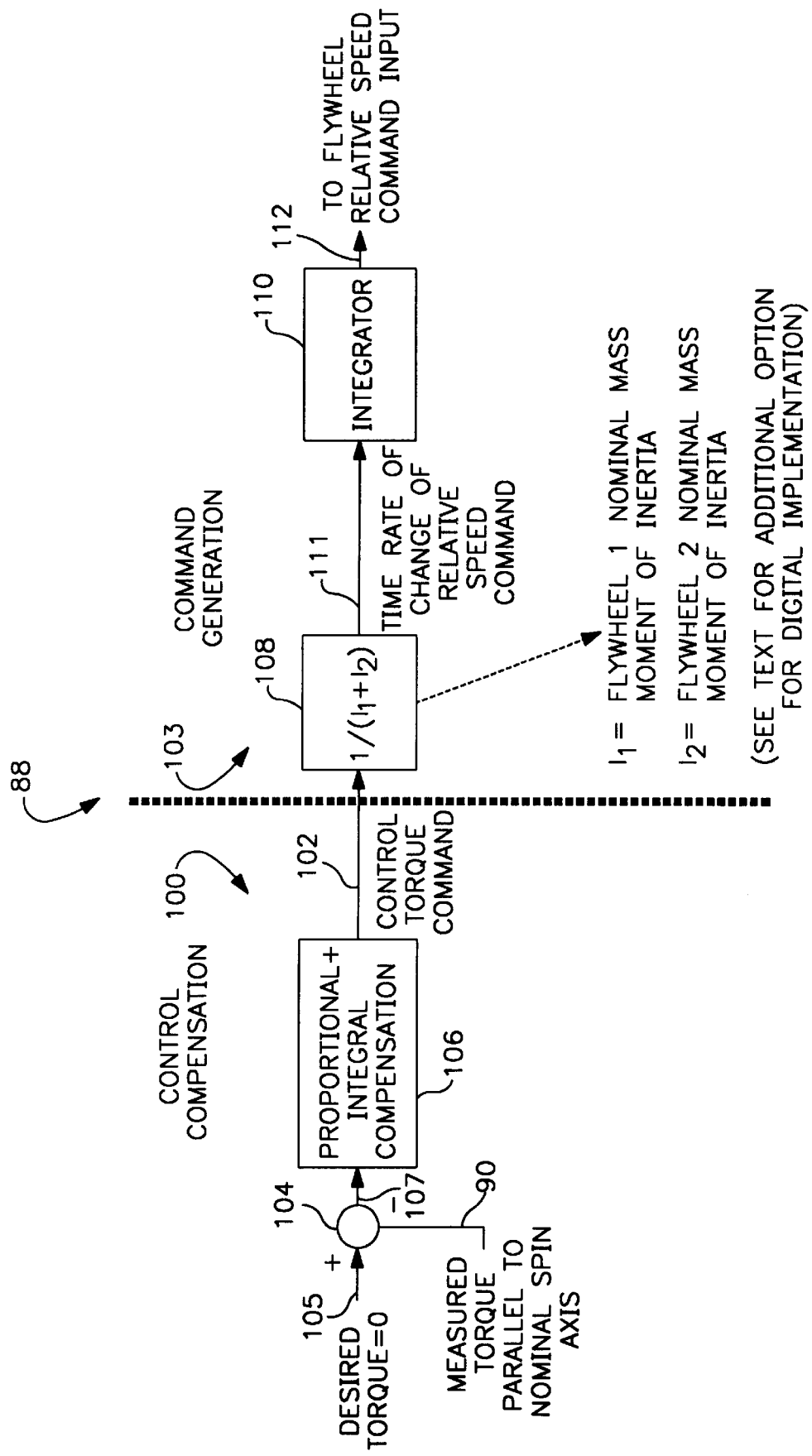
FIG. 7 is a schematic block diagram of components of a torque sensor processing component to reduce flywheel disturbance torques by using negative feedback as shown in FIG. 6.

FIG. 7 illustrates in greater detail the control compensation and command generation unit 88 of FIG. 6. Optionally, the control and compensation command unit 88 may have a flywheel relative speed command and analog implementation. However, a similar structure is possible in the case of a flywheel relative orientation command or digital implementation using corresponding sample data functions.

As illustrated, a control compensation portion 100 provides a control torque command 102 to the command generation portion 103. The control compensation portion 100 includes proportional and integral compensation to yield a stable loop capable of nulling out net flywheel torques. The control compensation 100 may also include filters, estimators, derivative compensators, limiters and other non-linear elements and internal and external mode switching.

Mode switching refers to using a different control law discussed below. For example, thrusters on a spacecraft introduce disturbances to the attitude of the spacecraft. Thus, the thrusters which are controlled at predetermined times and by predetermined amounts may be essentially switched off or blocked from the torque sensors. This control ensures that the rocket thruster torques or disturbances will not interfere with the torque sensing. Thus, the apparatus can hold the prior value before a thruster operation and then continue after the thruster operation is completed. In general, the other external disturbances (illustrated as reference numeral 18 in FIG. 1) are not blocked out by the mode switching.

The measured torque 90 parallel to the nominal spin axis (as shown in FIG. 6) is an input to a comparator 104. The other input to the comparator 104 is a desired torque input 105. The desired torque input 105 is preferably equal to zero.

In addition, a proportional and integral compensation unit 106 provides the control torque command output 102. The integral and proportional compensation unit 106 preferably includes the proportional compensation to adjust proportionately the relative speed to reduce the torque. The value of the proportional compensation provides a reduction in the torque, but would not drive it to zero. As a result, the integral compensation is provided to complement the proportional compensation by adding the past and present torque values over time to produce a bias command that cancels out the remaining torque without having an error. If the control compensation only consisted of proportional compensation, the input to the proportional and integral compensation unit 106 would need to be zero from the comparator 104. The use of only proportional compensation would not drive the torque to zero. Preferably, the integral compensation is used in conjunction with the proportional since the proportional compensation stabilizes the overall compensation when used with integral compensation. The output of the comparator 104 is a torque error 107 which is the input to the proportional and integral compensation unit 106.

The other half of FIG. 7 includes the command generation portion 103 which provides a function unit 108. The command generation portion 103 provides units conversion. In addition, the command generation portion 103 is based on the physical relations between the variables. The function unit 108 converts the control torque 102 from the control compensation portion 100 to a suitable command to the flywheel, based on the physical relation between the variables, for example, between the control torque and the time rate of change of relative speed. The variables may include the torque and the relative wheel speed.

To this end, an integrator 110 is also provided. The function unit 108 provides an output 111 corresponding to the time rate of change of relative speed command to the integrator 110 to produce an output 112 to the flywheel of the relative speed command input. The function unit 108 takes the reciprocal of the sum of the first flywheel 60 nominal mass moment of inertia $I_1$ and the second flywheel 62 nominal mass moment of inertia $I_2$.

In a digital implementation, not shown, an enhancement can be made to account for centrifugal expansion of the rotors by replacing the nominal mass moments of inertia values, $I_1$, $I_2$ in the command generation function 108 with values computed based on measured wheel speeds.

Figure 8:
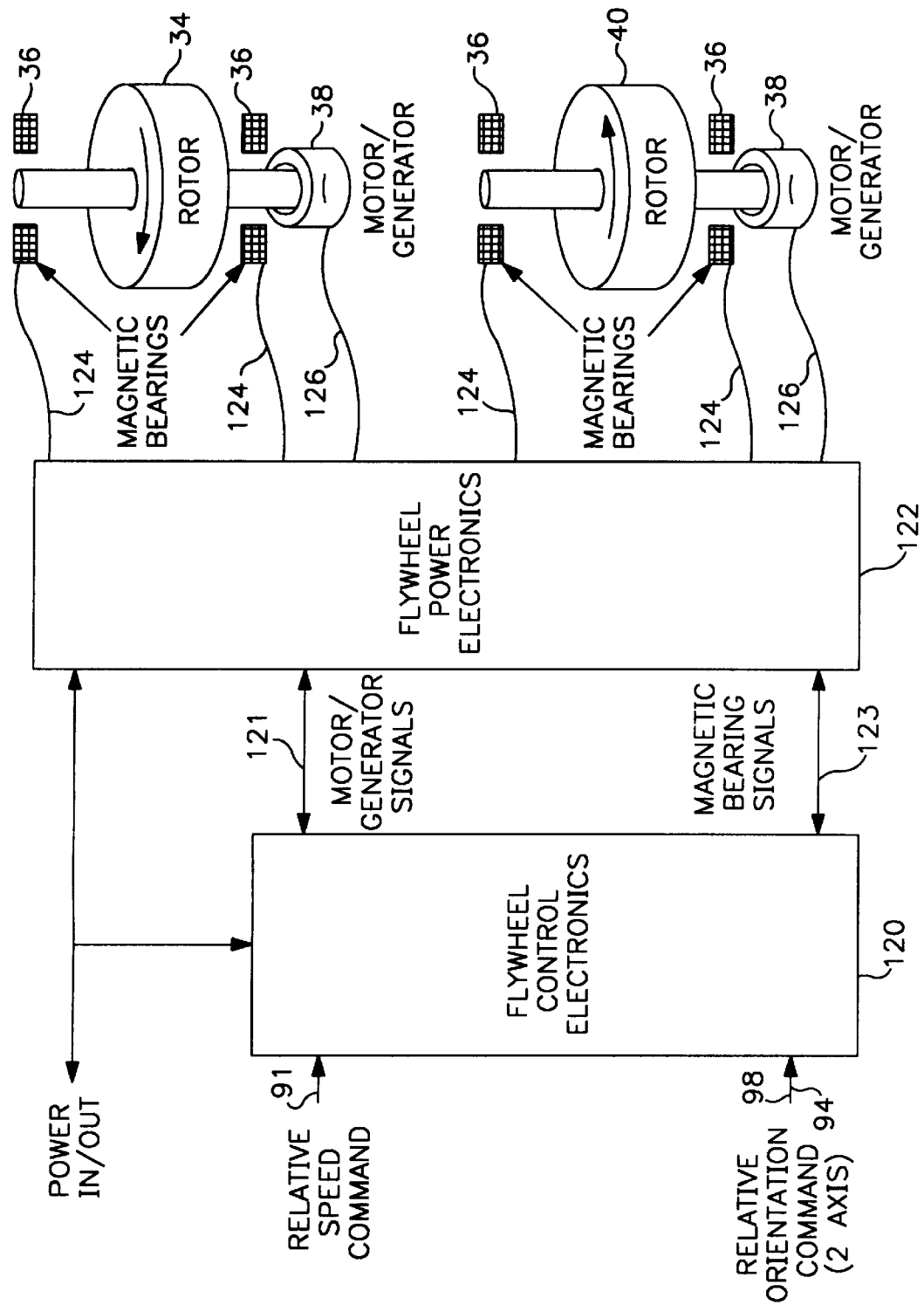
FIG. 8 is a block diagram schematically illustrating the counter-rotating flywheel pair plus electronics system, incorporating the electromechanical components of the counter-rotating pair of flywheels illustrated in FIG. 3.

FIG. 8 illustrates a top level view of the interfaces and construction of the flywheels including relative speed command inputs 91 and relative orientation command inputs 94, 98, as illustrated in FIG. 6. These inputs 91, 94, 98 feed a flywheel control electronics unit 120. The relative speed command 91 may also be implemented as a time rate of change of relative speed command, power sharing command or torque command with appropriate changes to the external control compensation (see FIG. 7). For example, a power sharing command may be implemented using the flywheel control electronics 120. The flywheel control electronics 120 would preferably include logic control. The flywheels 34, 40 generate a power proportional to the speed and the rate of change of speed. Thus, for example, if 1000 watts is produced by the two rotors, a balanced power sharing would be 500 watts each. However, if 490 watts were taken from one rotor and 510 watts from the other, there would be a power differential due to the uneven power sharing which would cause a torque. This would have the same effect over time as created by differential speed. Thus, adjustments can be made to the flywheel pair 34, 40 by adjusting how much power the flywheel is producing and/or taking. This can adjust the relative torques to correct for disturbances to the vehicle.

Motor/generator signals 121 are provided between the flywheel control electronics 120 and flywheel power electronics 122. In addition, magnetic bearing signals 123 pass between the flywheel control electronics 120 and the flywheel power electronics 122. The magnetic bearing signals 123 are communicated to the magnetic bearings 36 via the flywheel power electronics 122 along connections 124. The flywheel power electronics 122 also provides connections 126 to the motor/generators 38.

Figure 9:
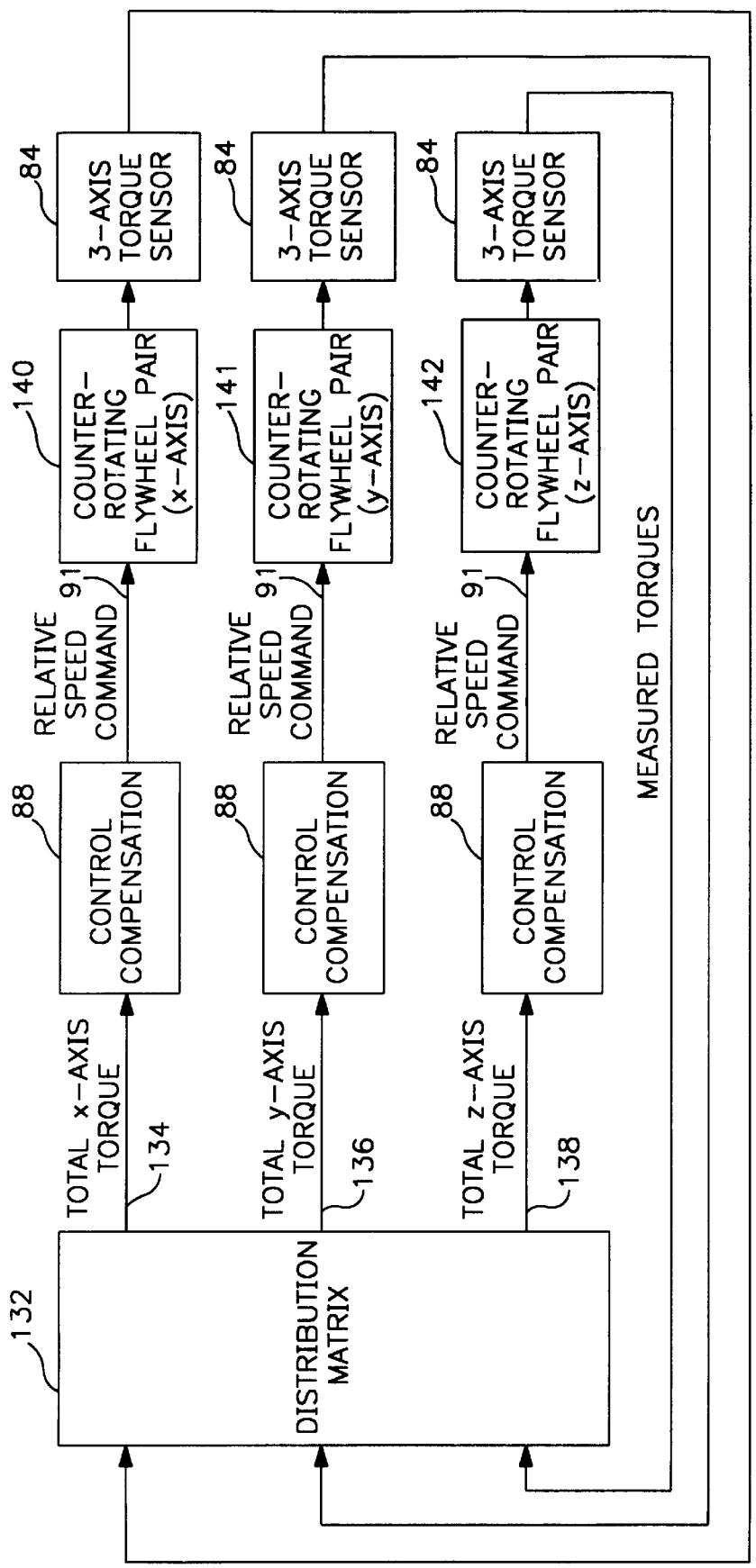
FIG. 9 is a block diagram illustrating the torque sensor and processing component of FIG. 5 in greater detail for three orthogonal counter-rotating flywheel pairs.

An alternative configuration embodiment is shown in FIG. 9. This embodiment utilizes three orthogonal pairs of flywheels, each pair arranged along an orthogonal axis. The torque sensor and processing, referenced generally at 130, is an alternative embodiment of the torque and sensing processing block 81 in FIGS. 5 and 6. This embodiment of the torque sensor and processing 130 utilizes a 9-input, 3-output distribution matrix 132 to compute the total torque about each of three orthogonal axis, X, Y and Z. The total X-axis torque 134 is fed to a control compensation unit 88. Similarly, the total Y-axis torque 136 and the total Z-axis torque 138 are also fed to control units 88. The total axis torques 134, 136, 138 are used to generate relative speed commands 91 to the flywheel pairs referenced 140, 141 and 142 in FIG. 9, as discussed with reference to FIG. 6 and FIG. 8. However, the relative orientation capability of the flywheel pairs 140, 141, 142 is not needed, thereby resulting in a simpler and lower cost flywheel design. Thus, the relative speed of each pair can be controlled so that the three-axis correction is achieved.

Figure 10:
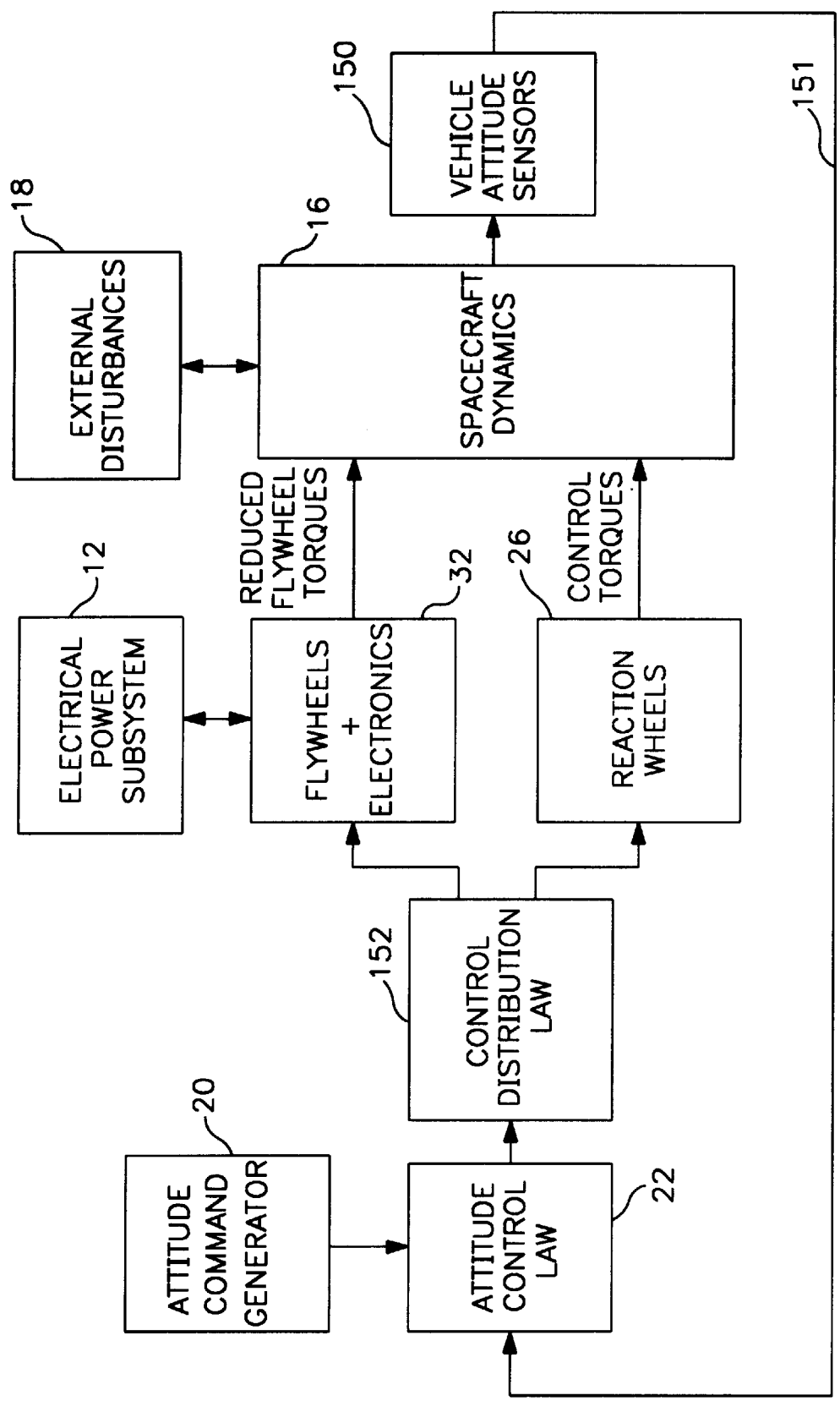
FIG. 10 is a schematic block diagram of a vehicle attitude control sensor system to automatically trim flywheel mechanical disturbances having a distribution control operating in accordance with the principles of the present invention.

FIG. 10 illustrates an embodiment of the present invention wherein flywheel disturbance trim using vehicle attitude sensors 150 is provided. Feedback is used to automatically trim out flywheel mechanical disturbances. For example, FIG. 10 shows the use of the existing vehicle attitude control sensors 150 to automatically trim flywheel mechanical disturbances by using a feedback path 151 to the attitude control law 22, as shown in FIG. 2. In addition, the conventional vehicle attitude control system is modified by adding a control distribution law 152 between the attitude control law 22 and the vehicle control actuators which are shown as reaction wheels 26. The control distribution law 152 is provided to coordinate the flywheels 34, 40 and the reaction wheels 26 so that together the disturbance torque is reduced.

Figure 11:
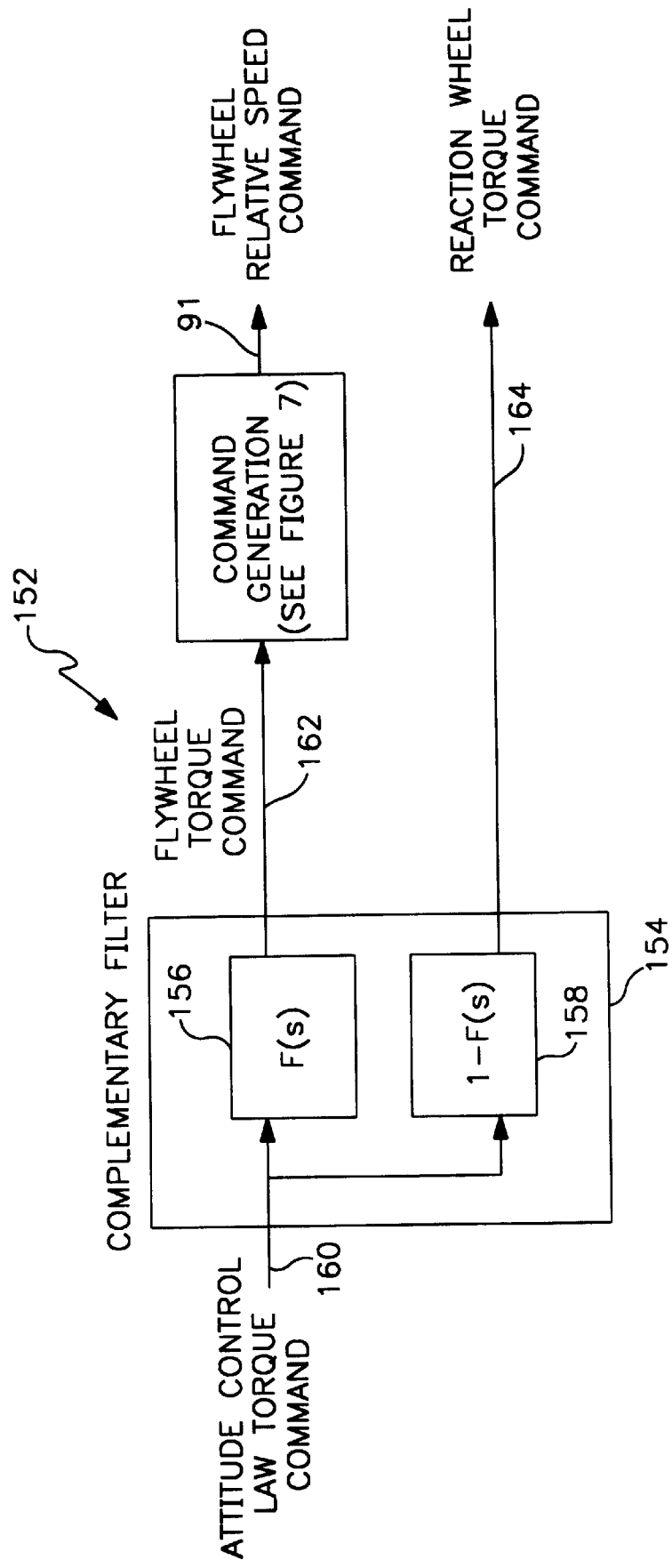
FIG. 11 is a detailed view of an embodiment of the distribution control illustrated in FIG. 10.

The control distribution law 152 is illustrated in more detail in an embodiment shown in FIG. 11. The control distribution law 152 illustrates the case of a flywheel relative speed command and uses analog implementation. However, a similar structure for the case of flywheel relative orientation command is possible, as well as digital implementation using corresponding sampled data functions. The detailed control distribution law 152 in FIG. 11 has a second output that is used to command the flywheel speed difference.

In a preferred embodiment, the control distribution law includes a complementary filter 154 incorporating a low pass type filter F(s) 156 in the path connected to the flywheel pair and its complement, 1-F(s) 158, in the path connected to the vehicle control actuator, or reaction wheels 26. The function of the complementary filter 154 is to direct the long-term average of the vehicle attitude torque 160 to the flywheels via a flywheel torque command 162 and the transient component of the vehicle attitude torque to the vehicle control actuators, the reaction wheels 26, via a reaction wheel torque command 164. The vehicle attitude torque 160 can be implemented from the flywheels 34, 40 or the reaction wheels 26 or a combination of both. Thus, the high frequency, short-term component of the vehicle attitude torque is handled by the reaction wheels 26. Similarly, the long-term average and the disturbances are absorbed by the flywheels 34, 40. Thus, the complementary filter 154 which has the two parts F(s) 156 and 1-F(s) 158, when added, equal one so that the complementary filter 154 provides an apportionment of the attitude control torque command 160. Thus, for example, transient effects such as clocking the solar array are handled by the reaction wheels 26, whereas gravity gradients and other long-term disturbances are absorbed by the flywheels 34, 40. This is because the flywheels 34, 40 generally have a very large momentum handling capability. Thus, the present invention exploits this capability.

By setting the transition or crossover frequency in the complementary filter 154 at a frequency sufficiently below the vehicle attitude control law bandwidth, addition of the control distribution law 152 has negligible impact on the performance or stability of the vehicle attitude control law 22. In a spacecraft application, the transition frequency of the complementary filter 154 would be set above the orbit frequency or the frequency of the predominant external disturbance.

The long-term average of the vehicle attitude control torque provides a measure of the net disturbance of the vehicle, which includes a contribution from the flywheels and a contribution from external disturbance sources. The primary advantage of the present invention is to minimize the impact of the flywheel energy storage system on the vehicle ACS by relieving the vehicle control reaction wheels of having to store the net momentum resulting from flywheel mismatch.

However, the present invention also has the benefit of using the flywheels with their typically large momentum capability to store at least a portion of momentum resulting from the external disturbances. The second feature further reduces the reaction wheel requirements.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

I claim:

1. An energy storage system providing enhanced mechanical stability in an electrically-powered vehicle, said system comprising:

at least one pair of counter-rotating energy storage flywheels arranged on the vehicle, each flywheel producing a component torque that combine to generate a first net torque on the vehicle;

torque sensing means for sensing the first net torque generated by the flywheels and producing a net torque output;

vehicle control means for controlling attitude of the vehicle;

vehicle attitude sensing means for sensing attitude changes caused by an external disturbance to the vehicle and providing an output indicative of the attitude;

means, responsive to the output of the vehicle attitude sensing means and the net torque output of the torque sensing means, for adjusting a relative speed or orientation of at least one of the flywheels thereby counteracting the external disturbance and the first net torque; and a vehicle control actuator, separate and apart from said pair of flywheels, for generating a second net torque, said first and second net torques combining to adjust the vehicle attitude.

2. The system of claim 1, further comprising:

sensor means external to the flywheels for providing additional feedback commands to the flywheels for reducing mechanical disturbances to the vehicle.

3. The system of claim 1, wherein:

said torque sensing means is arranged between the flywheels and the vehicle.

4. The system of claim 3, wherein said torque sensing means comprises a single multi-axis device.

5. The system of claim 3, wherein said torque sensing means comprises multiple force sensors with known separations and means for synthesizing a measurement from the multiple force sensors.

6. The system of claim 1, wherein:

said vehicle attitude sensing means is arranged on the vehicle.

7. The system of claim 6, wherein said vehicle attitude sensing means comprises at least one device selected from a group consisting of: a gyroscope, a sun sensor, a star sensor, an earth sensor, a magnetometer and a horizon sensor.

8. The system of claim 1, wherein:

said torque sensing means comprises a single torque sensor connected to the flywheels in a nulling loop constructed and arranged to directly measure the net torque produced by the flywheels.

9. The system of claim 8, wherein:

said vehicle attitude sensing means comprises a vehicle attitude sensor constructed and arranged to reduce residual torque sensing errors.

10. The system of claim 1, further comprising at least one additional pair of counter-rotating energy storage flywheels.

11. The system of claim 10, wherein the pairs of flywheels are mutually perpendicular.

12. The system of claim 1, further comprising:

means for applying an attitude control law; and means for generating control distribution signals controlling said flywheels and said vehicle control actuator to distribute attitude control between said first and second net torques.

13. The system of claim 12, wherein said means for generating control distribution signals comprises:

means for controlling a flywheel speed difference.

14. The system of claim 12, wherein said means for generating control distribution signals comprises:

means for controlling a time rate of change of flywheel speed difference.

15. The system of claim 12, wherein said means for generating control distribution signals comprises:

means for controlling power sharing between the flywheels.

16. The system of claim 12, wherein said means for generating control distribution signals comprises:

means for controlling a torque difference between the flywheels.

17. The system of claim 12, wherein said means for generating control distribution signals comprises:
   means for controlling a relative orientation of the flywheels.

18. The system of claim 12, wherein said means for generating control distribution signals comprises:
   means for controlling a time rate of change of relative orientation of the flywheels.

19. The system of claim 12, wherein said means for generating control distribution signals comprises:
   a complementary filter comprising a low pass filter F(s) arranged in a path connected to the flywheels and a complement filter, 1-F(s), arranged in a path connected to the vehicle control actuator.

20. The system of claim 19, wherein said complementary filter directs a long-term average of a vehicle control actuator torque to the flywheels and a transient component of the vehicle control actuator torque to the vehicle control actuator, the sum equaling a vehicle attitude control torque command.

21. The system of claim 20, wherein said complementary filter has a transition frequency sufficiently below the vehicle control law bandwidth.

22. The system of claim 21, wherein said transition frequency in said complementary filter is set above an orbit frequency of the vehicle.

23. The system of claim 21, wherein said transition frequency in said complementary filter is set above a frequency of predominant external disturbances.

24. The system of claim 21, wherein a long-term average of the vehicle attitude control torque is a measure of net disturbances on the vehicle.

25. The system of claim 1 further comprising:
   transformation means constructed and arranged for resolving torque measurements to control axes thereby yielding a transformed measured torque value;
   means for applying the transformed measured torque value to a compensation means for providing a command to the flywheel thereby reducing the torque generated by the flywheel; and
   control compensation means for nulling out net flywheel torques using proportional and integral compensation to yield a stable loop.

26. The system of claim 25 wherein said control compensation means further comprises:
   at least one device selected from a group consisting of: a filter, an estimator, a derivative compensation device, a limiter, a non-linear element, an internally controlled mode switching device and an externally controlled mode switching device.

27. The system of claim 25 further comprising:
   command generation function means for converting a control torque command from said compensation means to a suitable command to the flywheels based on the physical relation between variables.

28. The system of claim 27, further comprising:
   digitally implemented means for compensating for centrifugal expansion of rotors of the flywheels by replacing nominal mass moments of inertia values in the command generation function means with values computed based on measured wheel speeds.

29. A method for reducing mechanical disturbances from energy storage flywheels arranged in an electrically-powered vehicle, the method comprising the steps of:
   sensing a net torque on the vehicle generated by the flywheels to provide a net torque measurement;
   sensing an attitude of the vehicle to provide an attitude output;
   processing the net torque measurement and the attitude output to produce a control signal;
   distributing the control signal between a vehicle actuator and the energy storage flywheels according to a control distribution law; and
   modifying a relative speed or orientation of the vehicle actuator and the energy storage flywheels in response to the control signal to reduce the effect of an external disturbance and the net torque produced by the flywheels on the vehicle.

30. A flywheel-powered electric vehicle system comprising:
   a vehicle structure;
   an electrical power subsystem arranged on the vehicle structure;
   a pair of counter-rotating energy storage flywheels mounted to a flywheel mounting plate, the pair of flywheels electrically connected to the electrical power subsystem;
   torque sensing means arranged between the flywheel mounting plate and the vehicle structure for sensing a net torque on the vehicle resulting from the pair of flywheels and generating a torque signal indicative thereof;
   a vehicle attitude sensor arranged on the vehicle structure to measure the effect of a disturbance on the vehicle, the sensor producing an attitude signal;
   vehicle attitude actuator means arranged on the vehicle structure for counteracting the disturbance; and
   electronic processing means arranged on the vehicle structure and connected to the pair of counter-rotating energy storage flywheels, the torque sensing means, the vehicle attitude sensor, the vehicle attitude actuator means, and the electrical power subsystem, the electronic processing means for processing the attitude signal and the torque signal and providing a control signal in response thereto to the vehicle attitude actuator means thereby reducing a net torque on the vehicle.

31. An energy storage system providing enhanced mechanical stability in an electrically-powered vehicle, said system comprising:
   a pair of counter-rotating energy storage flywheels producing a net torque;
   means for sensing the net torque and providing a net torque signal in response thereto;
   means, connected to the means for sensing, for processing the net torque signal and producing a control signal;
   means for applying an attitude control law;
   a vehicle control actuator connected to the vehicle;
   means for applying a control distribution law arranged between the means for applying the attitude control law and the vehicle control actuator, said control distribution law being applied to the vehicle control actuator and to the energy storage flywheels; and
   means responsive to the control signal for controlling the pair of flywheels to reduce the net torque produced by the pair of flywheels.

32. The system of claim 31, further comprising:
   means for controlling speed of rotation of at least one of the pair of flywheels.

33. The system of claim 31, further comprising:
   means for controlling orientation of at least one of the pair of flywheels with respect to a spin axis.

34. The system of claim 31, further comprising:

magnetic bearings constructed and arranged to maintain the pair of flywheels along respective parallel spin axes.

35. An energy storage system providing enhanced mechanical stability in an electrically-powered craft, the system comprising:

dynamics control means for controlling dynamic operation of the craft;

attitude sensing means for sensing disturbances affecting an attitude of the craft and providing an output indicative of the disturbance;

attitude control means constructed and arranged to receive the output of the attitude sensing means and providing an attitude control output signal;

distribution control means, constructed and arranged to receive the attitude control output signal from the attitude control means, for apportioning torque by providing a first output and a second output;

a pair of counter-rotating energy storage flywheels constructed and arranged to receive the first output of the distribution control means and provide a reduced net flywheel torque to the dynamics control means; and control actuator means constructed and arranged to receive the second output of the distribution control means and provide a control torque to the dynamics control means;

wherein the attitude sensing means, the attitude control means, the distribution control means, the pair of flywheels and the control actuator means form a feedback loop with the dynamics control means.

36. The system of claim 35, further comprising:

sensor means arranged external to the flywheels for providing feedback commands to the flywheels to reduce the net torque produced by the flywheels.

37. The system of claim 35, wherein the distribution control means connected to the attitude control means to apportion torque between the flywheels and the control actuator means further comprises means for apportioning a long-term average value of vehicle attitude torque to the flywheels and a transient torque to the control actuator means.

38. The system of claim 37, wherein the distribution control means further comprises:

a complementary filter comprising a low pass filter F(s) arranged in a path connected to the pair of counter-rotating energy storage flywheels and a complement filter, 1-F(s), arranged in a path connected to the control actuator means.

39. The system of claim 38, wherein the complementary filter directs a long-term average of a vehicle control actuator torque to the flywheels and a transient component of the vehicle control actuator torque to the control actuator means, the sum equaling a vehicle attitude control torque command.

* * * * *